UNITED STATES PATENT OFFICE.

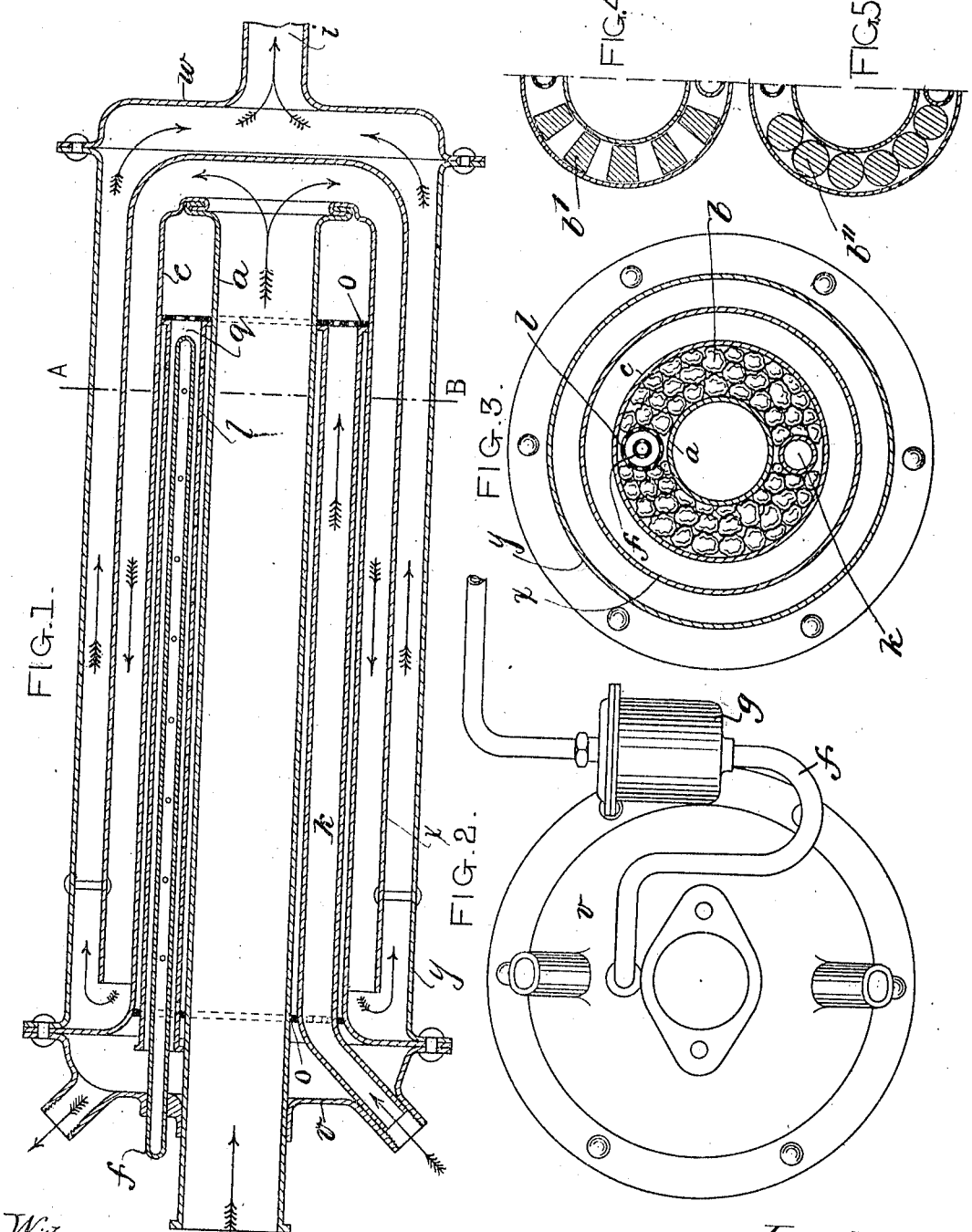

GOGU CONSTANTINESCU, OF BLOOMSBURY, LONDON, ENGLAND.

CARBURETER FOR INTERNAL-COMBUSTION ENGINES.

1,021,039.      Specification of Letters Patent.    Patented Mar. 26, 1912.

Application filed August 21, 1911. Serial No. 645,250.

REISSUED

*To all whom it may concern:*

Be it known that I, GOGU CONSTANTINESCU, a subject of the King of Roumania, residing at Bloomsbury, London, in England, have invented certain new and useful Improvements in Carbureters for Internal-Combustion Engines, of which the following is a specification.

The present invention consists in improvements in surface carbureters wherein carbureting takes place in a chamber surrounding a horizontal exhaust gas conduit, the fuel being fed into said chamber from a perforated feed pipe and said chamber containing heat conducting bodies or masses. I have described such carbureter in the specification filed with my co-pending application Serial No. 642,244.

The object of the present invention is to effect certain structural improvements in the apparatus in regard to the arrangement of the air and fuel inlets.

The invention is illustrated in the accompanying drawing, in which:—

Figure 1 is a longitudinal section of the carbureter; Fig. 2 an end-view thereof; Fig. 3 a section on the line A—B of Fig. 1; Fig. 4 a half cross section of the carbureting chamber, illustrating a modification, and Fig. 5 a half cross section of said chamber, illustrating another modification.

As shown in Fig. 1, I have, in my present invention, placed both the fuel feed and the air inlet at that end of the carbureter at which the exhaust gases enter the apparatus, the fuel feed chamber $g$ being fixed to the cover $v$ which has the port for entrance of the said gases. The feed pipe $f$ passes into the upper part of the annular chamber $q$ between the horizontal cylinders $a$ and $c$, whereof the former receives the influx of exhaust gases.

In the construction shown in Fig. 3 the chamber $q$ is filled, as described in my prior specification cited, with lumps or fragments of heat conducting material $b$, for example copper or iron, onto which the fuel trickles from the lateral perforations in the horizontal part of the pipe $f$. I find it important to have the under part of this horizontal pipe imperforate as otherwise too much of the fuel runs out at the inlet end and there is no uniform distribution along the length of the annular carbureting chamber. Within the annular chamber the pipe is surrounded by a perforated pipe $l$. The nodules $b$ are supported at the ends of the chamber by perforated rings $o$.

In the modification shown in Fig. 4, I substitute for the fragments or lumps $b$, metal rods $b^1$ of approximately rectangular cross section, spaced apart and extending through the chamber $q$ parallel with the axis of the cylinder $a$. These rods fit loosely into the chamber $q$ so as to leave small clearance for the passage of fuel between their inner and outer faces and the walls of the chamber.

In the modification shown in Fig. 5 I use cylindrical metal rods $b^{11}$ arranged in contact with each other; these rods may, if desired, be made tubular, for saving of weight. The function of the rods $b^1$ and $b^{11}$ like that of the nodules $b$ is on the one hand to afford a large evaporating surface, and on the other hand to act as a heat accumulator which will assist in furnishing heat while the engine is running below normal speed, and will enable the carbureter to start work again, without auxiliary heating, after a lengthy stoppage of the engine.

According to my present invention the air inlet also takes place at the suction end of the carbureter, and for this purpose the apparatus illustrated has an air pipe $k$ which passes through the cover $v$ into the carbureting chamber, and through the said chamber toward the right hand end, where it terminates in the annular space inclosed by the joined ends of the cylinders $a$ and $c$. These cylinders consist of sections of tubing, the ends of which are joined by a lap joint. The air issuing from the pipe $k$ is sucked through the interstices between the fragments or nodules $b$ or through the spaces between the rods $b^1$ or $b^{11}$ and passes out of the apparatus through the pipe $i$. The exhaust gases take the zig-zag path indicated in the drawing by arrows, and by this means the exhaust is silenced. In order to form the said zig-zag path a hollow cylinder $x$ open at the left hand end and closed at the right hand end is disposed between the cylinder $c$ and the outer casing $y$.

The disposition of the air and fuel inlet, as described in my present specification, eliminates the connections between the carbureting chamber and the right hand cover $w$ of the apparatus, and thus leaves at this part a clearer passage for the exhaust gases. The arrangement of the air pipe in the carbureting chamber also insures effective heating of the air prior to carbureting. The joint between the two cylinders $a$ and $b$ can easily be made so tight, by soldering or brazing, as to obviate risk of exhaust gases entering the carbureting chamber. I may use a plurality of air pipes traversing the said chamber, if the size of the apparatus renders subdivision of the air supply desirable.

Another advantage of disposing the fuel inlet and air inlet at the same end as the exhaust inlet lies in the fact that the structure can be so made as to allow of free expansion thereof, in all its parts, in one axial direction, thus eliminating tendency to warp and shear.

What I claim as my invention and desire to secure by Letters Patent of the United States is:—

1. A carbureter comprising a horizontal motor exhaust conduit, a carbureting chamber surrounding said conduit and closed, at one end, by junction of its wall to the wall of said conduit, non-absorbent heat conducting bodies disposed in said chamber with interstices between them adequate for the passage of the air to be carbureted, a horizontal perforated fuel feed pipe extending into said chamber so as to afford a series of fuel delivery orifices distributed along the length of the chamber, and an air pipe extending into said chamber and terminating with its delivery orifice near said closed end of the chamber, the inlets of air, fuel and exhaust gas being all at the opposite end of the apparatus.

2. A carbureter comprising a horizontal motor exhaust conduit, a carbureting chamber surrounding said conduit and closed, at one end, by junction of its wall to the wall of said conduit, non-absorbent heat conducting bodies disposed in said chamber with interstices between them adequate for the passage of the air to be carbureted, a horizontal perforated fuel feed pipe extending into said chamber so as to afford a series of fuel delivery orifices distributed along the length of the chamber, an air pipe extending into said chamber and terminating with its delivery orifice near said closed end of the chamber, the inlets of air, fuel and exhaust gas being all at the opposite end of the apparatus, an external casing, and a hollow cylinder closed at one end and open at the other interposed between said casing and said carbureting chamber so that the exhaust gases must take a zig-zag path from the exhaust conduit through the said cylinder and then through the casing.

In witness whereof I have signed this specification in the presence of two witnesses.

GOGU CONSTANTINESCU.

Witnesses:
A. J. HADDAN,
E. HAMPTON.